(12) United States Patent
Nonomura et al.

(10) Patent No.: US 8,360,920 B2
(45) Date of Patent: Jan. 29, 2013

(54) CONTINUOUSLY VARIABLE TRANSMISSION AND CONTROL METHOD THEREOF

(75) Inventors: Ryousuke Nonomura, Kawasaki (JP); Hiroyasu Tanaka, Atsugi (JP); Takuichiro Inoue, Fujisawa (JP); Jouji Seki, Zama (JP); Mamiko Inoue, Ebina (JP); Norio Asai, Atsugi (JP); Seiichiro Takahashi, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 281 days.

(21) Appl. No.: 12/836,021

(22) Filed: Jul. 14, 2010

(65) Prior Publication Data

US 2011/0015834 A1    Jan. 20, 2011

(30) Foreign Application Priority Data

Jul. 17, 2009 (JP) ................................. 2009-169148
Apr. 20, 2010 (JP) ................................. 2010-096773

(51) Int. Cl.
*F16H 37/02* (2006.01)
(52) U.S. Cl. ........................ 475/209; 475/198
(58) Field of Classification Search .................. 475/198, 475/207, 209, 210, 214; 477/34, 37, 41, 477/44, 79, 80, 99
See application file for complete search history.

(56) References Cited

U.S. PATENT DOCUMENTS

| | | | |
|---|---|---|---|
| 4,672,863 A | 6/1987 | Itoh et al. | |
| 4,674,359 A | 6/1987 | Hattori | |
| 4,793,217 A | 12/1988 | Morisawa et al. | |
| 5,207,122 A | 5/1993 | Minagawa | |
| 5,282,401 A | 2/1994 | Hebbale et al. | |
| 5,427,579 A | 6/1995 | Kanehara et al. | |
| 5,456,647 A | 10/1995 | Holbrook | |
| 5,468,198 A | 11/1995 | Holbrook et al. | |
| 5,827,153 A | 10/1998 | Yasue et al. | |
| 5,947,856 A | 9/1999 | Tabata et al. | |
| 6,157,884 A | 12/2000 | Narita et al. | |
| 6,295,497 B1 | 9/2001 | Kuras | |
| 7,108,631 B2 | 9/2006 | Inoue et al. | |
| 7,637,836 B2 | 12/2009 | Watanabe et al. | |
| 7,780,570 B2 | 8/2010 | Iwatsuki et al. | |

(Continued)

FOREIGN PATENT DOCUMENTS

| DE | 34 24 646 A1 | 2/1985 |
|---|---|---|
| DE | 100 51 692 A1 | 5/2001 |

(Continued)

OTHER PUBLICATIONS

R. Nonomura et al., US PTO Notice of Allowance, U.S. Appl. No. 12/828,604, dated Jun. 7, 2012, (12 pgs.).

(Continued)

*Primary Examiner* — Justin Holmes
(74) *Attorney, Agent, or Firm* — Foley & Lardner LLP

(57) ABSTRACT

When a vehicle stops in a travel range, a transmission controller sets a subtransmission mechanism in a second speed interlocking condition in which a torque input into a continuously variable transmission is transmitted in a second gear position and both a frictional engagement element of a first gear position and a frictional engagement element of the second gear position are engaged, and when a predetermined condition is established while the vehicle is stationary, the transmission controller reduces an output shaft torque of the continuously variable transmission.

9 Claims, 10 Drawing Sheets

U.S. PATENT DOCUMENTS

| | | | |
|---|---|---|---|
| 8,052,572 | B2 | 11/2011 | Unno |
| 8,131,436 | B2 | 3/2012 | Suzuki et al. |
| 8,142,330 | B2 * | 3/2012 | Suzuki et al. .................. 477/46 |
| 8,187,145 | B2 | 5/2012 | Kaminsky et al. |
| 8,204,659 | B2 | 6/2012 | Kouno et al. |
| 8,214,093 | B2 | 7/2012 | Heap et al. |
| 2006/0089775 | A1 | 4/2006 | Whitton et al. |
| 2007/0129922 | A1 | 6/2007 | Lee et al. |
| 2008/0020896 | A1 | 1/2008 | Kamishima |
| 2008/0032861 | A1 | 2/2008 | Maki et al. |
| 2008/0096721 | A1 | 4/2008 | Honma et al. |
| 2009/0105041 | A1 | 4/2009 | McKenzie et al. |
| 2009/0111650 | A1 | 4/2009 | Jeon |
| 2010/0057316 | A1 | 3/2010 | Tanaka et al. |
| 2010/0228412 | A1 | 9/2010 | Sah |
| 2012/0083977 | A1 * | 4/2012 | Tanaka et al. .................. 701/55 |

FOREIGN PATENT DOCUMENTS

| | | |
|---|---|---|
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 63-266264 A | 11/1988 |
| JP | 63-266265 A | 11/1988 |
| JP | 4-211760 A | 8/1992 |
| JP | 5-10427 A | 1/1993 |
| JP | 05-026317 A | 2/1993 |
| JP | 5-71627 A | 3/1993 |
| JP | 05-079554 A | 3/1993 |
| JP | 6-331013 A | 11/1994 |
| JP | 06-331016 A | 11/1994 |
| JP | 8-178043 A | 7/1996 |
| JP | 9-210165 A | 8/1997 |
| JP | 10-299880 A | 11/1998 |
| JP | 11-51162 A | 2/1999 |
| JP | 11-082721 A | 3/1999 |
| JP | 11-093987 A | 4/1999 |
| JP | 11-182663 A | 7/1999 |
| JP | 11-210874 A | 8/1999 |
| JP | 2000-145939 A | 5/2000 |
| JP | 2000-266173 A | 9/2000 |
| JP | 2000-346169 A | 12/2000 |
| JP | 2002-89701 A | 3/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2007-92665 A | 4/2007 |
| JP | 2007-118727 A | 5/2007 |
| JP | 2007-146906 A | 6/2007 |
| JP | 2008-059052 A | 3/2008 |

OTHER PUBLICATIONS

U.S. Appl. No. 12/836,099, filed Jul. 14, 2010, Takahashi et al.
U.S. Appl. No. 12/836,104, filed Jul. 14, 2010, Takahashi et al.
U.S. Appl. No. 12/836,128, filed Jul. 14, 2010, Takahashi et al.
U.S. Appl. No. 12/837,129, filed Jul. 15, 2010, Takahashi et al.
U.S. Appl. No. 12/837,133, filed Jul. 15, 2010, Takahashi et al.
U.S. Appl. No. 12/836,172, filed Jul. 14, 2010, Takahashi et al.
U.S. Appl. No. 12/828,604, filed Jul. 1, 2010, Nonomura et al.
R. Nonomura et al., US PTO Notice of Allowance, U.S. Appl. No. 12/828,604, dated Feb. 13, 2012, (17 pgs.).
S. Takahashi et al., US PTO Office Action on U.S. Appl. No. 12/836,099 DTD Sep. 18, 2012, (23 pgs.).
S. Takahashi et al. US PTO Office Action on U.S. Appl. No. 12/836,104 DTD Sep. 24, 2012, (24 pgs.).
S. Takahashi et al., US PTO Notice of Allowance on U.S. Appl. No. 12/836,128 DTD Sep. 17, 2012, (50 pgs.).
S. Takahashi et al., US PTO Notice of Allowance on U.S. Appl. No. 12/837,129 DTD Oct. 11, 2012, (20 pgs.).
S. Takahashi et al., US PTO Notice of Allowance on U.S. Appl. No. 12/836,172 DTD Oct. 19, 2012, (20 pgs.).

* cited by examiner

CONTINUOUSLY VARIABLE TRANSMISSION AND CONTROL METHOD THEREOF

TECHNICAL FIELD OF THE INVENTION

This invention relates to a continuously variable transmission and a control method thereof, and more particularly to a continuously variable transmission comprising a belt continuously variable speed change mechanism and a subtransmission mechanism.

BACKGROUND OF THE INVENTION

JP60-37455A discloses a continuously variable transmission in which a two-forward speed subtransmission mechanism is provided in series with a belt continuously variable speed change mechanism (to be referred to hereafter as a "variator"), and a gear position of the subtransmission mechanism is changed in accordance with an operating condition of a vehicle. Thus, an achievable speed ratio range is enlarged without increasing the size of the variator.

In this type of continuously variable transmission, the subtransmission mechanism is preferably set in a low gear position when the vehicle stops in order to secure sufficient driving force for the vehicle to restart. Hence, when the vehicle stops with the subtransmission mechanism in a low gear position, the gear position is maintained, and when the vehicle stops with the subtransmission mechanism in a high gear position, the subtransmission mechanism is shifted from the high gear position to the low gear position as the vehicle stops.

SUMMARY OF THE INVENTION

However, when the vehicle stops in a D range and a select lever is operated from the D range to an N range (to be referred to hereafter as a "D-N select"), a frictional engagement element for realizing the low gear position is disengaged by draining an oil pressure supplied to the frictional engagement element and shock occurs. Shock occurs similarly when the vehicle stops in the D range and neutral idle control (to be referred to hereafter as "N idle control"), in which the oil pressure supplied to the frictional engagement element is reduced to an oil pressure that is barely sufficient for engagement, is performed.

The reason for this is that during the stoppage, a torque input into the continuously variable transmission is transmitted to an output shaft via the low gear position, in which a greater torque amplification effect is exhibited than in the high gear position, and therefore, when the output shaft torque is set at zero by a D-N select or reduced by N idle control from this state, a step (reduction width) in the output shaft torque increases.

JP11-93987A proposes a method of alleviating this type of shock by providing an orifice and an accumulator on an oil pressure supply path along which oil pressure is supplied to the frictional engagement element for realizing the low gear position so that the supplied oil pressure is reduced gently. With this method, however, the oil pressure supplied to engage the frictional engagement element also increases gently, and therefore a different problem arises in that engagement of the frictional engagement element is delayed.

An object of this invention is to reduce shock occurring when an output shaft torque of a continuously variable transmission is reduced during vehicle stoppage.

According to an aspect of the present invention, a continuously variable transmission installed in a vehicle is provided. The transmission includes a variator capable of varying a speed ratio continuously; a subtransmission mechanism provided in series with the variator and having a first gear position and a second gear position, the second gear position having a smaller speed ratio than the first gear position, as forward gear positions; a shift control unit that sets a target value of an overall speed ratio of the variator and the subtransmission mechanism on the basis of an operating condition of the vehicle and controls at least one of the variator and the subtransmission mechanism such that the target value is realized; a second speed interlocking unit that sets the subtransmission mechanism in a second speed interlocking condition, in which a torque is transmitted in the second gear position and both a frictional engagement element of the first gear position and a frictional engagement element of the second gear position are engaged, when the vehicle stops while a position of a select lever remains in a travel range; and a transmitted torque reduction unit that reduces an output shaft torque of the continuously variable transmission when a predetermined condition is established while the vehicle is stationary.

According to another aspect of the present invention, a control method for a continuously variable transmission is provided. The transmission is installed in a vehicle and includes a variator capable of varying a speed ratio continuously and a subtransmission mechanism provided in series with the variator and having a first gear position and a second gear position, the second gear position having a smaller speed ratio than the first gear position, as forward gear positions. The control method includes setting a target value of an overall speed ratio of the variator and the subtransmission mechanism on the basis of an operating condition of the vehicle and controlling at least one of the variator and the subtransmission mechanism such that the target value is realized; setting the subtransmission mechanism in a second speed interlocking condition, in which a torque is transmitted in the second gear position and both a frictional engagement element of the first gear position and a frictional engagement element of the second gear position are engaged, when the vehicle stops while a position of a select lever remains in a travel range; and reducing an output shaft torque of the continuously variable transmission when a predetermined condition is established while the vehicle is stationary.

Embodiments and advantages of this invention will be described in detail below with reference to the attached figures.

DESCRIPTION OF THE PREFERRED EMBODIMENTS

In the following description, a "speed ratio" of a certain speed change mechanism is a value obtained by dividing an input rotation speed of the speed change mechanism by an output rotation speed of the speed change mechanism. Further, a "Lowest speed ratio" is a maximum speed ratio of the speed change mechanism and a "Highest speed ratio" is a minimum speed ratio of the speed change mechanism.

Figure 1:
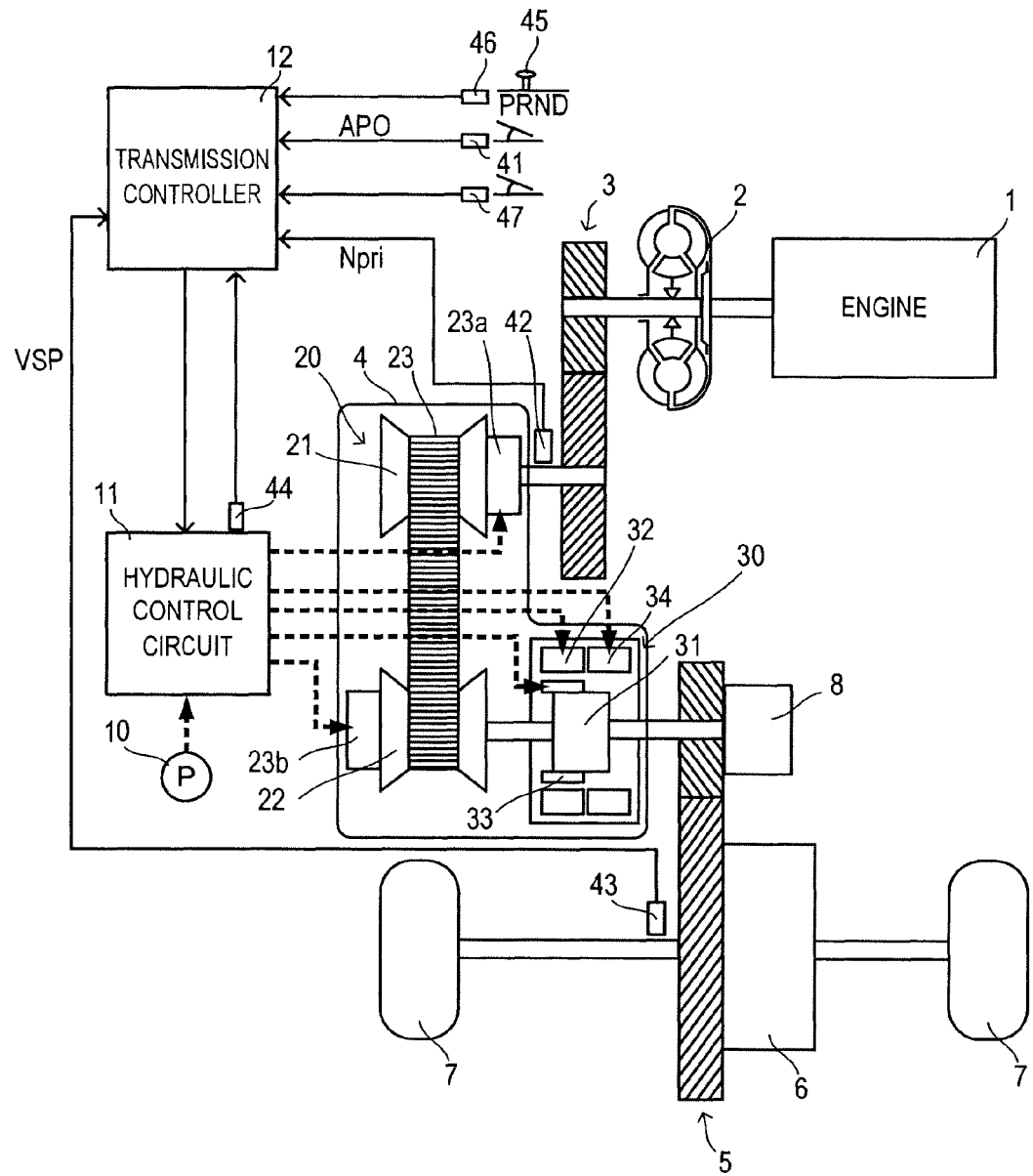
FIG. 1 is a schematic diagram showing a vehicle installed with a continuously variable transmission according to an embodiment of this invention.

FIG. 1 is a schematic diagram showing a vehicle installed with a continuously variable transmission according to an embodiment of this invention. The vehicle includes an engine 1 as a power source. An output rotation of the engine 1 is transmitted to drive wheels 7 via a torque converter 2 including a lockup clutch, a first gear train 3, a continuously variable transmission 4 (to be referred to simply as a "transmission" hereafter), a second gear train 5, and a final reduction gear 6. The second gear train 5 is provided with a parking mechanism 8 which locks an output shaft of the transmission 4 mechanically during parking so that the output shaft of the transmission 4 cannot rotate.

Further, the vehicle is provided with an oil pump 10 that is driven using a part of the power of the engine 1, a hydraulic control circuit 11 that regulates an oil pressure from the oil pump 10 and supplies the regulated oil pressure to respective sites of the transmission 4, and a transmission controller 12 that controls the hydraulic control circuit 11.

The transmission 4 includes a belt continuously variable speed change mechanism 20 (to be referred to hereafter as a "variator"), and a subtransmission mechanism 30 provided in series with the variator 20. Here, "provided in series" means that the variator 20 and the subtransmission mechanism 30 are provided in series on a power transmission path. The subtransmission mechanism 30 may be connected to an output shaft of the variator 20 directly, as in this example, or via another speed change/power transmission mechanism (a gear train, for example).

The variator 20 is a belt type continuously variable speed change mechanism and includes a primary pulley 21, a secondary pulley 22, and a V belt 23 wrapped around the pulleys 21, 22. The pulleys 21, 22 respectively include a fixed conical plate, a movable conical plate disposed relative to the fixed conical plate such that respective sheave surfaces thereof oppose each other, thereby forming a V groove, and hydraulic cylinders 23a, 23b provided on a back surface of the movable conical plate so as to displace the movable conical plate in an axial direction. When oil pressure supplied to the hydraulic cylinders 23a, 23b is regulated, a width of the V groove varies, causing a contact radius between the V belt 23 and the respective pulleys 21, 22 to vary, and as a result, the speed ratio of the variator 20 is varied continuously.

The subtransmission mechanism 30 is a speed change mechanism having two-forward speed and single-reverse speed. The subtransmission mechanism 30 includes a Ravigneaux planetary gear mechanism 31 in which carriers of two planetary gears are coupled, and a plurality of frictional engagement elements (a Low brake 32, a High clutch 33, and a Rev brake 34) which are connected to a plurality of rotational elements constituting the Ravigneaux planetary gear mechanism 31 so as to modify rotation states thereof. When engagement/disengagement states of the respective frictional engagement elements 32 to 34 are modified by regulating oil pressures supplied to the respective frictional engagement elements 32 to 34, the gear position of the subtransmission mechanism 30 is changed.

For example, when the Low brake 32 is engaged and the High clutch 33 and Rev brake 34 are disengaged, the gear position of the subtransmission mechanism 30 becomes a first speed. When the High clutch 33 is engaged and the Low brake 32 and Rev brake 34 are disengaged, the gear position of the subtransmission mechanism 30 becomes a second speed in which the speed ratio is smaller than that of the first speed. Further, when the Rev brake 34 is engaged and the Low brake 32 and High clutch 33 are disengaged, the gear position of the subtransmission mechanism 30 becomes the reverse speed. In the following description, the terms "the transmission 4 is in a low speed mode" and "the transmission 4 is in a high speed mode" will be used to indicate that the gear position of the subtransmission mechanism 30 corresponds to the first speed and the second speed, respectively.

Figure 2:
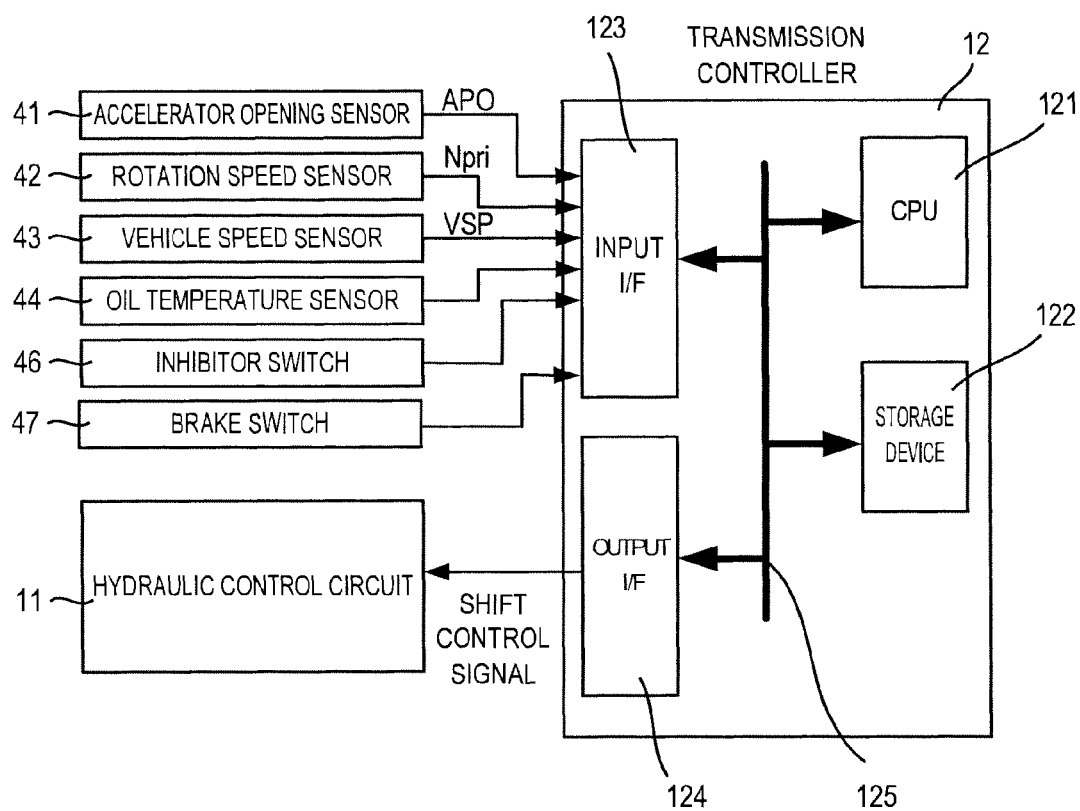
FIG. 2 is a view showing an internal constitution of a transmission controller.

As shown in FIG. 2, the transmission controller 12 is constituted by a CPU 121, a memory device 122 including a RAM and a ROM, an input interface 123, an output interface 124, and a bus 125 that connects these components to each other.

An output signal from an accelerator opening sensor 41 that detects an accelerator opening APO, which is an operating amount of an accelerator pedal, an output signal from a rotation speed sensor 42 that detects an input rotation speed of the transmission 4 (=a rotation speed of the primary pulley 21; to be referred to hereafter as a "primary rotation speed Npri"), an output signal from a vehicle speed sensor 43 that detects a vehicle speed VSP, an output signal from an oil temperature sensor 44 that detects an oil temperature of the transmission 4, an output signal from an inhibitor switch 46 that detects a position of a select lever, and so on are input into the input interface 123.

The memory device 122 stores a shift control program of the transmission 4, and a shift map (FIG. 3) used by the shift control program. The CPU 121 reads and executes the shift control program stored in the memory device 122, generates a shift control signal by implementing various types of calculation processing on the various signals input via the input interface 123, and outputs the generated shift control signal to the hydraulic control circuit 11 via the output interface 124. Various values used during the calculation processing executed by the CPU 121 and results of the calculation processing are stored in the memory device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, regulate the oil pressure generated by the oil pump 10 to a required oil pressure, and supply the regulated oil pressure to the respective sites of the transmission 4. Thus, the speed ratio of the variator 20 and the gear position of the subtransmission mechanism 30 are changed, whereby a shift is performed in the transmission 4.

Figure 3:
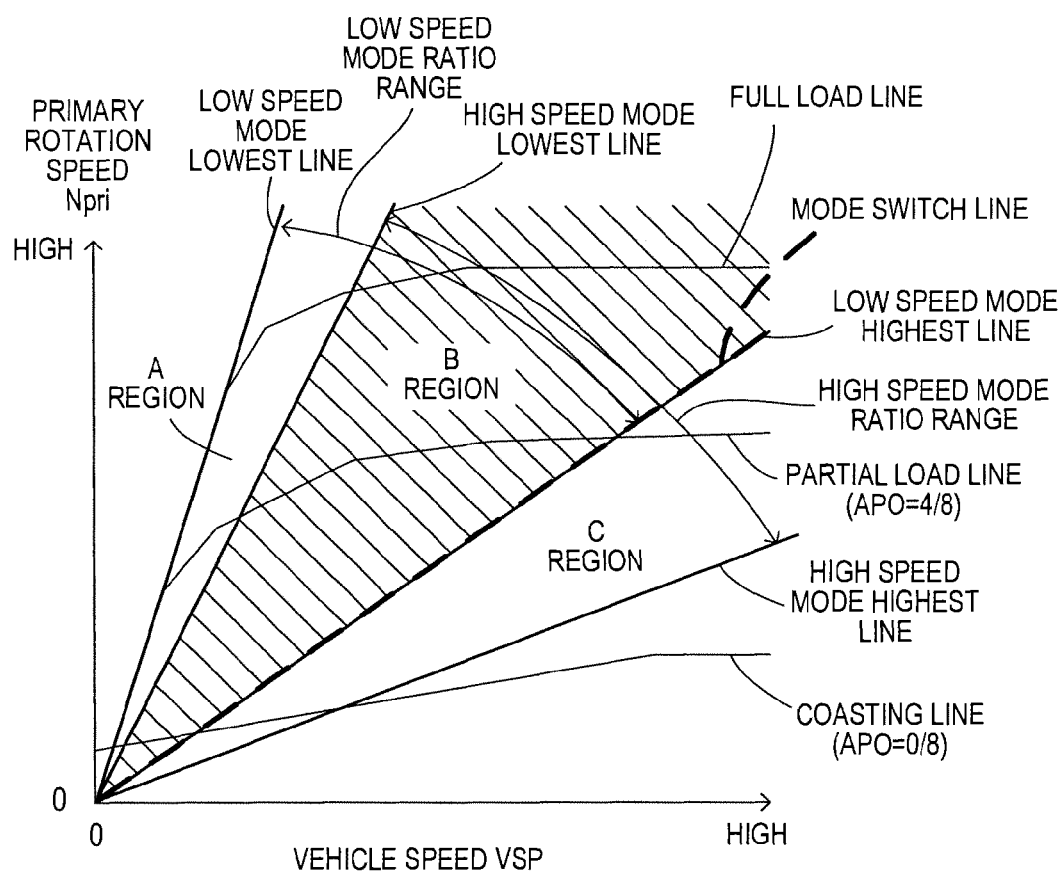
FIG. 3 is a view showing an example of a shift map.

FIG. 3 shows an example of the shift map stored in the memory device 122.

On the shift map, operating points of the transmission 4 are defined by the vehicle speed VSP and the primary rotation speed Npri. An incline of a line linking the operating point of the transmission 4 and a zero point in a lower left corner of the shift map corresponds to the speed ratio of the transmission 4 (an overall speed ratio obtained by multiplying the speed ratio of the subtransmission mechanism 30 by the speed ratio of the variator 20; to be referred to hereafter as a "through speed ratio"). On this shift map, similarly to a shift map of a conventional belt continuously variable transmission, a shift line is set for each accelerator opening APO, and a shift is performed in the transmission 4 in accordance with a shift line selected according to the accelerator opening APO. For the sake of simplicity, FIG. 3 shows only a full load line (a shift line when the accelerator opening APO=8/8), a partial load line (a shift line when the accelerator opening APO=4/8), and a coasting line (a shift line when the accelerator opening APO=0/8).

When the transmission 4 is in the low speed mode, the transmission 4 can be shifted between a low speed mode Lowest line obtained by setting the speed ratio vRatio of the variator 20 at maximum and a low speed mode Highest line obtained by setting the speed ratio vRatio of the variator 20 at minimum. In the low speed mode, the operating point of the transmission 4 moves within an A region and a B region. When the transmission 4 is in the high speed mode, on the other hand, the transmission 4 can be shifted between a high speed mode Lowest line obtained by setting the speed ratio vRatio of the variator 20 at maximum and a high speed mode Highest line obtained by setting the speed ratio vRatio of the variator 20 at minimum. In the high speed mode, the operating point of the transmission 4 moves within the B region and a C region.

The speed ratio in each gear position of the subtransmission mechanism 30 is set such that the speed ratio corresponding to the low speed mode Highest line (the low speed mode Highest speed ratio) is smaller than the speed ratio corresponding to the high speed mode Lowest line (the high speed mode Lowest speed ratio). In so doing, a through speed ratio range of the transmission 4 that can be realized in the low speed mode (referred to as a "low speed mode ratio range" in the figure) partially overlaps a through speed ratio range of the transmission 4 that can be realized in the high speed mode (referred to as a "high speed mode ratio range" in the figure), and therefore, when the operating point of the transmission 4 is in the B region sandwiched between the high speed mode Lowest line and the low speed mode Highest line, the transmission 4 can select either the low speed mode or the high speed mode.

The transmission controller 12 sets the through speed ratio Ratio corresponding to the vehicle speed VSP and the accelerator opening APO (the operating conditions of the vehicle) as a final through speed ratio DRatio by referring to this shift map. The final through speed ratio DRatio is a final target value to be reached by the through speed ratio Ratio under the operating conditions. The transmission controller 12 then sets a target through speed ratio tRatio, which is a transitional target value for causing the through speed ratio Ratio to follow the final through speed ratio DRatio with a desired response characteristic, and controls the variator 20 and the subtransmission mechanism 30 such that the through speed ratio Ratio matches the target through speed ratio tRatio.

Further, a mode switch line (a 1-2 shift line of the subtransmission mechanism 30) at which the subtransmission mechanism 30 performs a shift is set on the shift map to overlap the low speed mode Highest line. A through speed ratio corresponding to the mode switch line (to be referred to hereafter as a "mode switch speed ratio mRatio") is set at an equal value to the low speed mode Highest speed ratio.

When the operating point of the transmission 4 crosses the mode switch line, or in other words when the through speed ratio Ratio of the transmission 4 varies across the mode switch shift ratio mRatio, the transmission controller 12 performs mode switch shift control. In the mode switch shift control, the transmission controller 12 performs a coordinated shift by shifting the subtransmission mechanism 30 and modifying a speed ratio vRatio of the variator 20 in an opposite direction to a variation direction of a speed ratio subRatio of the subtransmission mechanism 30.

In the coordinated shift, when the through speed ratio Ratio of the transmission 4 shifts from a state of being larger than the mode switch speed ratio mRatio to a state of being smaller, the transmission controller 12 modifies the gear position of the subtransmission mechanism 30 from the first speed to the second speed (to be referred to as a "1-2 shift" hereafter) and varies the speed ratio vRatio of the variator 20 to a large speed ratio side. Conversely, when the through speed ratio Ratio of the transmission 4 shifts from a state of being smaller than the mode switch speed ratio mRatio to a state of being larger, the transmission controller 12 modifies the gear position of the subtransmission mechanism 30 from the second speed to the first speed (to be referred to as a "2-1 shift" hereafter) and varies the speed ratio vRatio of the variator 20 to a small speed ratio side.

The reason why a coordinated shift is performed during a mode switch shift is to ensure that a driver does not experience an uncomfortable feeling due to input rotation variation caused by a step in the through speed ratio Ratio of the transmission 4. Further, the reason why the mode switch shift is performed when the speed ratio vRatio of the variator 20 corresponds to the Highest speed ratio is that in this state, torque input into the subtransmission mechanism 30 reaches a minimum based on the torque input into the variator 20 at this time, and by shifting the subtransmission mechanism 30 in this state, it is possible to alleviate shift shock in the subtransmission mechanism 30.

Further, according to the shift map, when the vehicle stops, the speed ratio vRatio of the variator 20 shifts to the Lowest speed ratio and the gear position of the subtransmission mechanism 30 shifts to the first speed.

Figure 4:
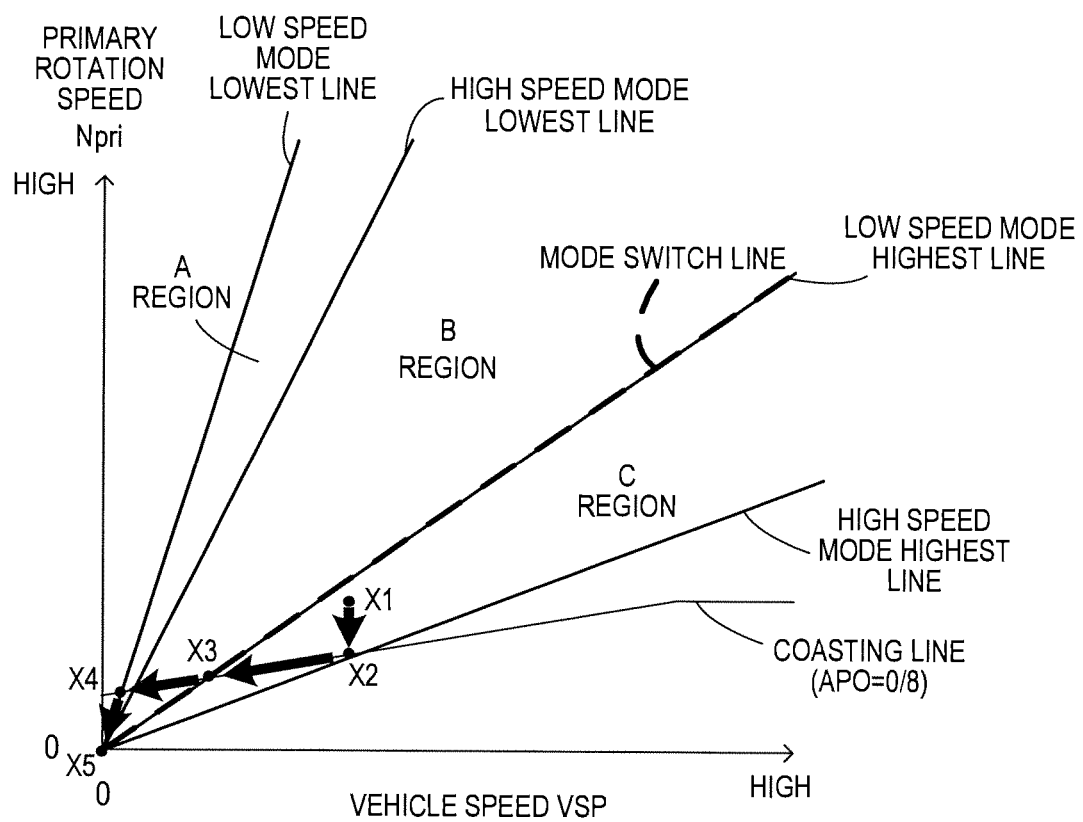
FIG. 4 is a view illustrating a shift when the vehicle stops.

FIG. 4 is a view showing movement of the operating point of the transmission 4 up to X5, at which the vehicle stops, when a foot is removed from the accelerator pedal such that vehicle deceleration begins while the operating point of the transmission 4 is at X1.

When the foot is removed from the accelerator pedal at X1, the operating point of the transmission 4 moves to X2 on a coasting line, whereupon the through speed ratio Ratio of the transmission 4 varies along the coasting line to the large speed ratio side. When the operating point of the transmission 4 reaches X3 on a mode switch line, the gear position of the subtransmission mechanism 30 is modified from the second speed to the first speed by the coordinated shift described above.

When the vehicle speed VSP decreases further such that the operating point of the transmission 4 moves to X4 on a low speed mode Lowest line, the speed ratio vRatio of the variator 20 shifts to the Lowest speed ratio. Thereafter, the operating point of the transmission 4 moves along the low speed mode Lowest line to X5, where the vehicle speed VSP reaches zero and the vehicle stops, and at X5, the speed ratio vRatio of the variator 20 corresponds to the Lowest speed ratio and the gear position of the subtransmission mechanism 30 corresponds to the first speed.

Here, a case in which the vehicle decelerates from X1 in a C region is illustrated, but the vehicle stops in an identical state, i.e. a state in which the speed ratio vRatio of the variator 20 corresponds to the Lowest speed ratio and the gear position of the subtransmission mechanism 30 corresponds to the first speed, in a case where the foot is removed from the accelerator pedal such that the vehicle decelerates when the operating point of the transmission 4 is in an A region or a B region.

When the vehicle stops while the position of the select lever 45 is in a travel range (a range such as a D range or an S range in which the torque of the engine 1 is transmitted to an output shaft thereof via the transmission 4; in the following description, the travel range is assumed to be the D range) and the gear position of the subtransmission mechanism 30 remains in the first speed, following problems arise since a torque amplification action of the first speed is greater than that of the second speed.

Firstly, when the select lever 45 is operated (to be referred to hereafter as a "D-N select") from the D range to an N range (a non-travel range in which the torque of the engine 1 is not transmitted to the output shaft via the transmission 4) during vehicle stoppage such that the Low brake 32 for realizing the first speed is disengaged by draining an oil pressure supplied to the Low brake 32, the output shaft torque of the transmission 4 decreases to zero from an output shaft torque (to be referred to hereafter as a "first speed torque") generated when the gear position of the subtransmission mechanism 30 is in the first speed, and as a result, a step (reduction width) of the output shaft torque becomes large, leading to shock.

Secondly, when a neutral idle condition (to be referred to hereafter as an "N idle condition") is established during vehicle stoppage and the oil pressure supplied to the Low brake 32 is reduced to an oil pressure that is barely sufficient to engage the Low brake 32 (a state in which opposing engagement members constituting the Low brake 32 barely contact each other or a state immediately prior to contact between the opposing engagement members) through neutral idle control (to be referred to hereafter as "N idle control"), the step (reduction width) of the output shaft torque becomes large similarly, leading to shock.

To alleviate this shock, when the vehicle stops while the position of the select lever 45 remains in the D range, the transmission controller 12 establishes an interlocking condition (to be referred to hereafter as a "second speed interlocking condition") in which the subtransmission mechanism 30 transmits torque in the second speed (the output shaft torque at this time will be referred to hereafter as a "second speed torque") and both the Low brake 32 and the High clutch 33 are engaged.

To realize the second speed interlocking condition, the transmission controller 12 first interlocks the subtransmission mechanism 30 by engaging the High clutch 33. In this state, the subtransmission mechanism 30 continues to transmit torque in the first speed and the output shaft torque of the transmission 4 remains at the first speed torque.

Next, the transmission controller 12 disengages the Low brake 32. Accordingly, the gear position for receiving torque transmission switches from the first speed to the second speed, whereby the subtransmission mechanism 30 transmits torque in the second speed and the output shaft torque of the transmission 4 decreases to the second speed torque. The transmission controller 12 then re-engages the Low brake 32 to interlock the subtransmission mechanism 30 again, but in this case, the subtransmission mechanism 30 continues to transmit torque in the second speed, and therefore the second speed interlocking condition is established in the subtransmission mechanism 30.

When the subtransmission mechanism 30 is held in the second speed interlocking condition, the output shaft torque decreases from the second speed torque even if a D-N select is performed such that the torque transmitted to the output shaft of the transmission 4 reaches zero or N idle control is performed such that the torque transmitted to the output shaft of the transmission 4 decreases. Therefore, the step in the output shaft torque is smaller than that of a case where the output shaft torque decreases from the first speed torque, and as a result, the shock described above is alleviated.

When the driver presses the accelerator pedal while the vehicle is stationary in the second speed interlocking condition, or in other words when the vehicle is restarted following reception of a startup request from the driver, the transmission controller 12 disengages the High clutch 33 to cancel interlocking of the subtransmission mechanism 30. Since the Low brake 32 is already engaged, the subtransmission mechanism 30 begins transmitting torque in the first speed as soon as the High clutch 33 is disengaged, and therefore problems such as a deficiency in startup driving force and an engagement delay in the Low brake 32 do not occur.

Figure 5:
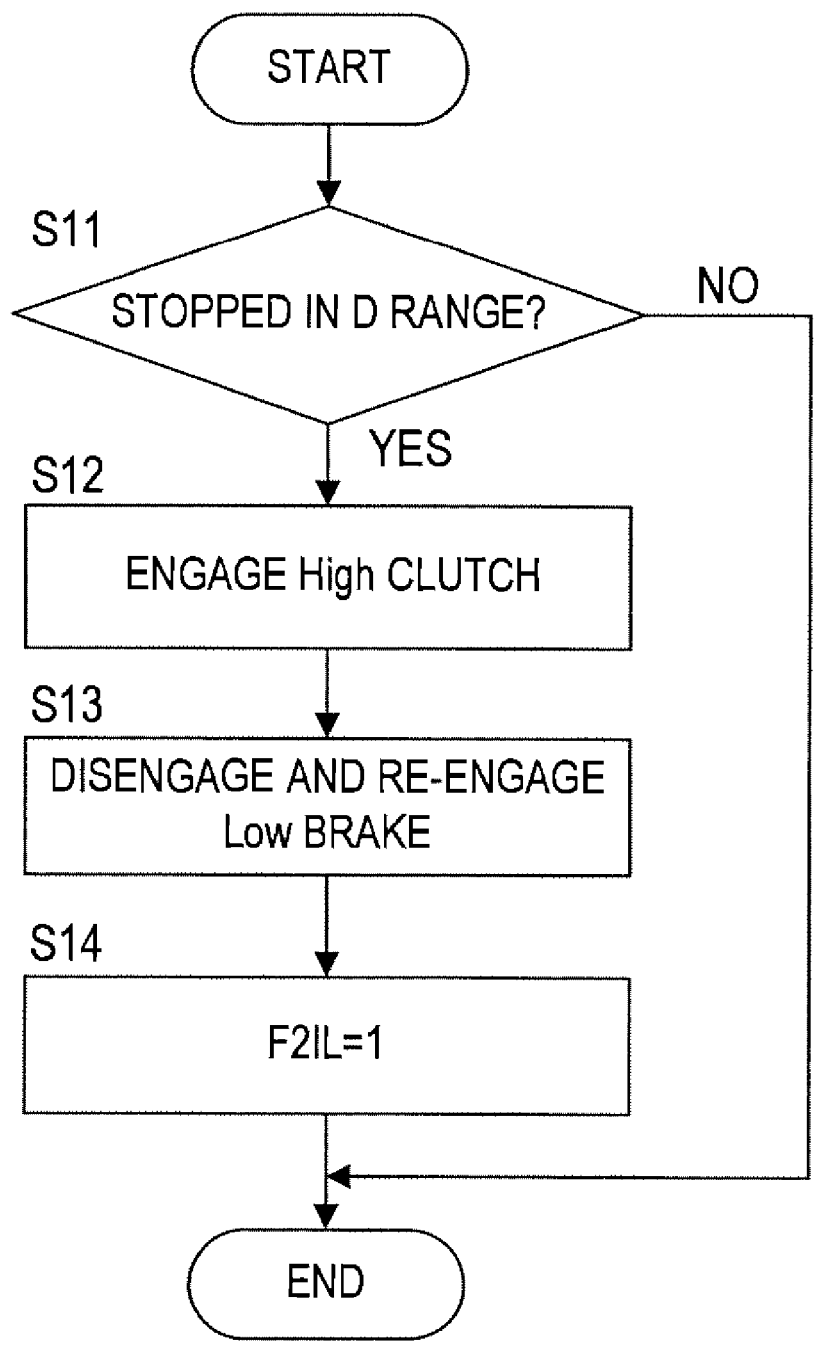
FIG. 5 is a flowchart showing the content of control executed to realize a second speed interlocking condition.

FIG. 5 shows an example of a control program executed to realize the second speed interlocking condition in the subtransmission mechanism 30. The specific content of control executed by the transmission controller 12 to realize the second speed interlocking condition will now be described with reference to FIG. 5. The flowchart shown in FIG. 5 is executed at predetermined time intervals (every 10 msec, for example).

In S11, the transmission controller 12 determines whether or not the vehicle has stopped in the D range. When it is determined that the vehicle has stopped in the D range, the processing advances to S12, and when a negative determination is made, the processing is terminated.

In S12, the transmission controller 12 interlocks the subtransmission mechanism 30 by increasing the oil pressure supplied to the High clutch 33 in order to engage the High clutch 33. In this state, the subtransmission mechanism 30 continues to transmit torque in the first speed.

In S13, the transmission controller 12 disengages the Low brake 32 by draining the oil pressure supplied to the Low brake 32 and then re-engages the Low brake 32 by increasing the oil pressure supplied thereto. When the Low brake 32 is disengaged, the subtransmission mechanism 30 transmits torque in the second speed, and this state is maintained even after the Low brake 32 is re-engaged such that the subtransmission mechanism 30 is interlocked again.

In S14, the transmission controller 12 sets a flag F2IL at one, indicating that the subtransmission mechanism 30 is in the second speed interlocking condition.

Hence, according to this control, when the vehicle stops in the D range, the second speed interlocking condition is realized in the subtransmission mechanism 30 and one is set in the flag F2IL (S11 to S14).

Figure 6:
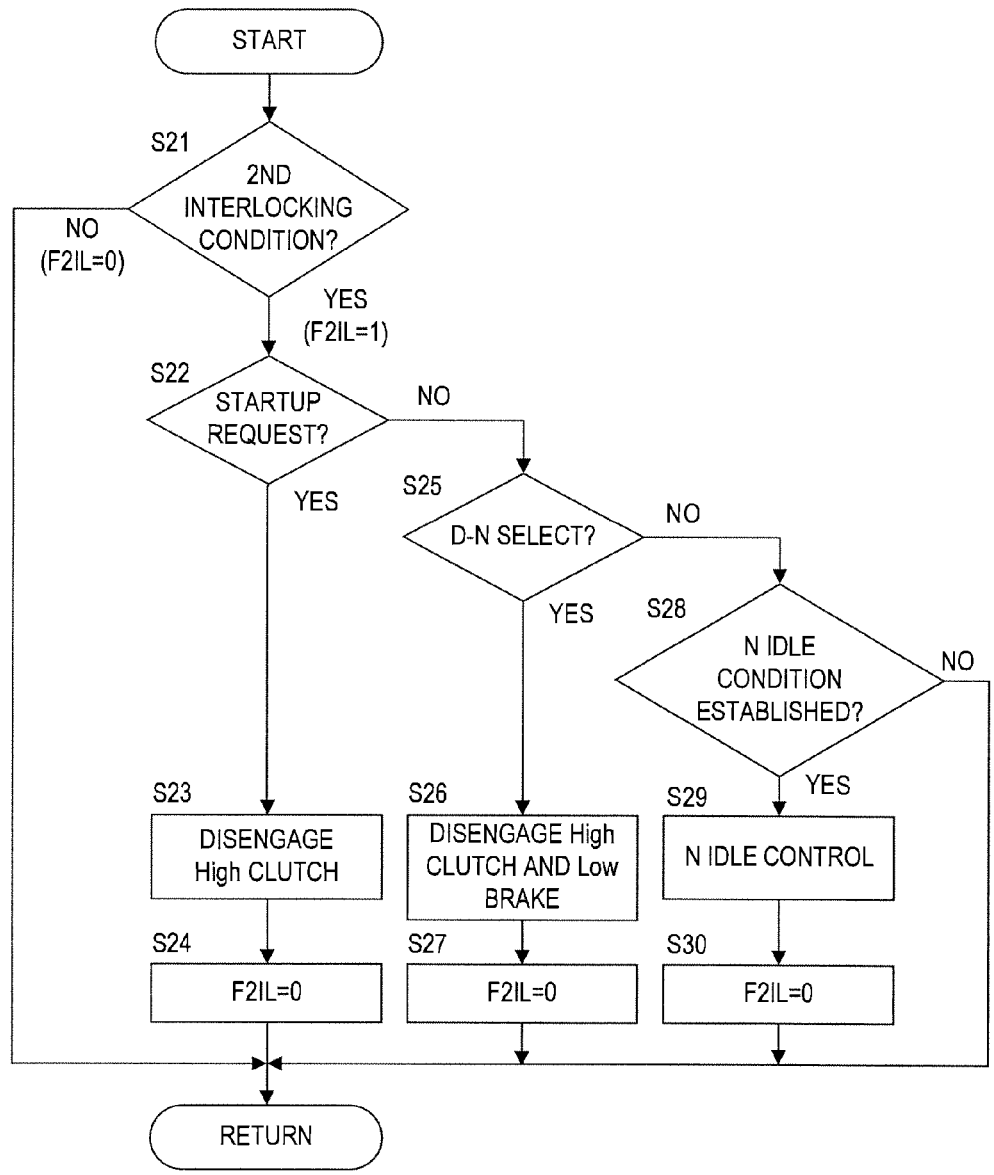
FIG. 6 is a flowchart showing the content of control executed in the second speed interlocking condition.

FIG. 6 shows an example of a control program executed in the second speed interlocking condition. The specific content of control executed by the transmission controller 12 in the second speed interlocking condition will now be described with reference to FIG. 6. The flowchart shown in FIG. 6 is executed at predetermined time intervals (every 10 msec, for example).

In S21, the transmission controller 12 determines whether or not the second speed interlocking condition is established on the basis of the value of the flag F2IL. When the flag F2IL is at one and it is therefore determined that the second speed interlocking condition is established, the processing advances to S22, and when a negative determination is made, the processing is terminated.

In S22, the transmission controller 12 determines whether or not the driver has issued a startup request. A startup request is determined to have been issued when it is detected that the foot has been removed from a brake pedal and the accelerator opening APO has varied from zero to a value other than zero, for example. When it is determined that a startup request has been issued, the processing advances to S23, and when a negative determination is made, the processing advances to S25.

In S23, the transmission controller 12 disengages the High clutch 33 by draining the oil pressure supplied to the High clutch 33. As a result, the second speed interlocking condition is canceled such that the output shaft torque of the transmission 4 increases from the second speed torque to the first speed torque, thereby securing sufficient driving force for the restart.

In S24, the transmission controller 12 sets the flag F2IL at zero, indicating that the second speed interlocking condition has been canceled.

In S25, the transmission controller 12 determines whether or not a D-N select has been performed. When it is determined that a D-N select has been performed, the processing advances to S26, and when a negative determination is made, the processing advances to S28.

In S26, the transmission controller 12 drains the oil pressure supplied to both the Low brake 32 and the High clutch 33 so that both elements are disengaged. As a result, the transmission 4 enters a neutral state in which the torque of the engine 1 is not transmitted to the output shaft, and the output shaft torque of the transmission 4 decreases to zero. However, since the output shaft torque of the transmission 4 decreases from the second speed torque, which is smaller than the first speed torque, the step in the output shaft torque is small, and therefore shock is suppressed to a low level.

In S27, the transmission controller 12 sets the flag F2IL at zero, indicating that the second speed interlocking condition has been canceled.

In S28, the transmission controller 12 determines whether or not the N idle condition is established. The N idle condition is determined to be established when all of the following conditions, for example, are satisfied.

The vehicle is stationary (VSP=0).
The brake pedal is depressed (brake switch 47=ON).
The foot is removed from the accelerator pedal (accelerator opening APO=0).
The position of the select lever 45 is in the D range.
Warm-up of the engine 1 and the transmission 4 is complete (determined on the basis of an engine cooling water temperature and a transmission oil temperature).

When it is determined that the N idle condition is established, the processing advances to S29, and when a negative determination is made, the processing is terminated.

In S29, the transmission controller 12 begins N idle control. In the N idle control, the transmission controller 12 disengages the High clutch 33 by draining the oil pressure supplied to the High clutch 33 and controls the oil pressure supplied to the Low brake 32 to an oil pressure that is barely sufficient to engage the Low brake 32 (a state in which the opposing engagement members constituting the Low brake 32 barely contact each other or a state immediately prior to contact between the opposing engagement members). When the N idle control is started, the output shaft torque of the transmission 4 decreases, but since the output shaft torque of the transmission 4 decreases from the second speed torque, which is smaller than the first speed torque, the step in the output shaft torque is small, and therefore shock is suppressed to a low level.

In S30, the transmission controller 12 sets the flag F2IL at zero, indicating that the second speed interlocking condition has been canceled.

Hence, according to this control, when a startup request is issued while the vehicle is stationary in the second speed interlocking condition, the second speed interlocking condition is canceled (S22, S23) and the output shaft torque of the transmission 4 is increased from the second speed torque to the first speed torque in order to secure sufficient driving force for the restart. Further, when the D-N select is performed, the transmission 4 is switched to the neutral state (S25, S26), and when the N idle condition is established, the N idle control is performed (S28, S29), but in both of these cases, the step in the output shaft torque of the transmission 4 is suppressed, and therefore shock is alleviated.

Next, actions and effects of the above control will be described with reference to FIGS. 7A to 7C.

Figure 7A:
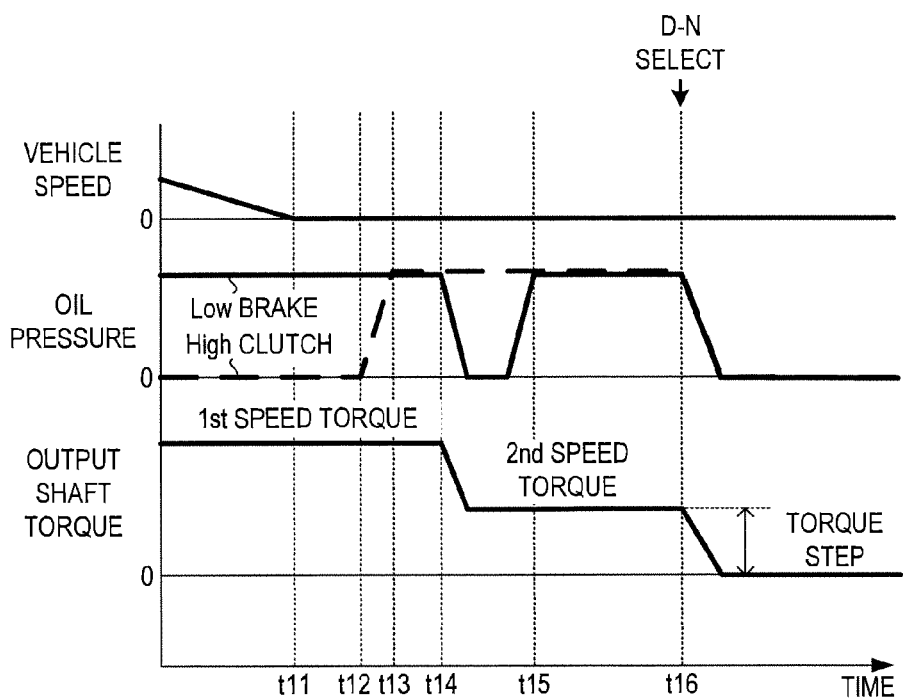
FIG. 7A is a time chart showing a case in which the second speed interlocking condition is established after the vehicle stops, and a D-N select is performed from this state.

FIG. 7A is a time chart showing a case in which the second speed interlocking condition is established after the vehicle stops, and a D-N select is performed from this state.

Once the vehicle speed VSP has reached zero at a time t11 so that the vehicle is stationary, the High clutch 33 is engaged at times t12 to t13, and as a result, the subtransmission mechanism 30 is interlocked.

At times t14 to t15, the Low brake 32 is disengaged such that the gear position of the subtransmission mechanism 30 that receives torque transmission switches from the first speed to the second speed and the output shaft torque of the transmission 4 falls from the first speed torque to the second speed torque. The Low brake 32 is then re-engaged such that the subtransmission mechanism 30 is interlocked again, but the output shaft torque of the transmission 4 is held at the second speed torque. Thus, the second speed interlocking condition is realized in the subtransmission mechanism 30.

At a time t16, the D-N select is performed such that the Low brake 32 and the High clutch 33 are both disengaged by draining the oil pressure supplied to the two elements, and accordingly, the output shaft torque of the transmission 4 falls to zero. However, since the output shaft torque has already been reduced to the second speed torque, the step in the output shaft torque is smaller than that of a case in which the output shaft torque falls to zero from the first speed torque, and therefore shock is alleviated.

Figure 7B:
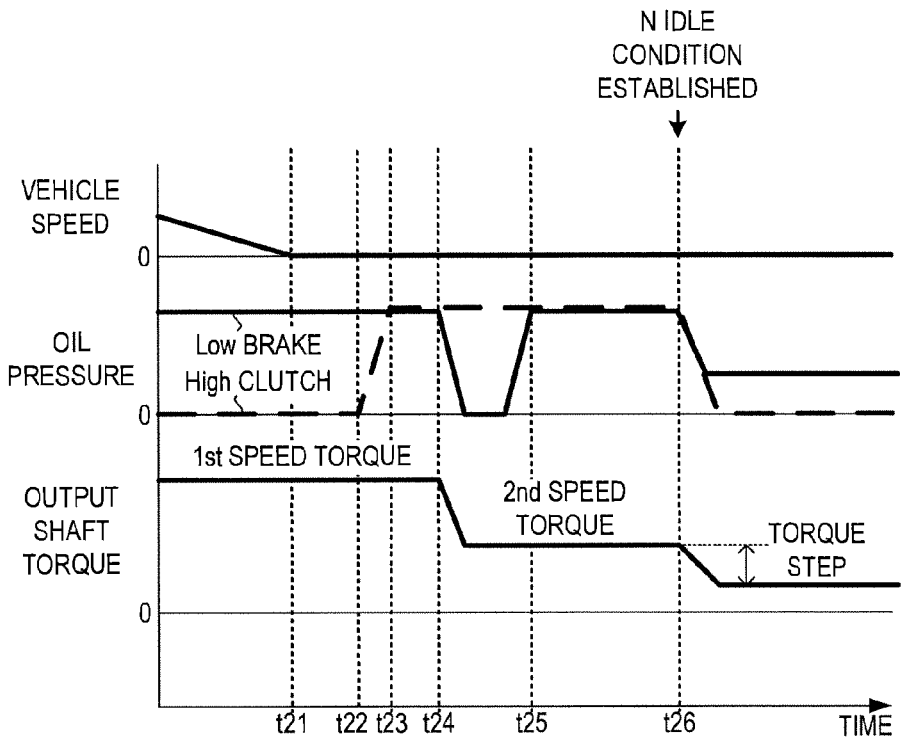
FIG. 7B is a time chart showing a case in which the second speed interlocking condition is established after the vehicle stops, and N idle control is performed from this state.

FIG. 7B is a time chart showing a case in which the second speed interlocking condition is established after the vehicle stops, and N idle control is performed from this state.

Times t21 to t25 are identical to the times t11 to t15 in FIG. 7A, and therefore the second speed interlocking condition is realized in the subtransmission mechanism 30 during this period.

At a time t26, the N idle condition is established and therefore the N idle control is begun. Accordingly, the oil pressure supplied to the High clutch 33 is drained and the oil pressure supplied to the Low brake 32 is reduced to an oil pressure at which the Low brake 32 is barely engaged. When the N idle control begins, the output shaft torque of the transmission 4 decreases, but since the output shaft torque has already been reduced to the second speed torque, the step in the output shaft torque is smaller than that of a case in which the output shaft torque falls to zero from the first speed torque, and therefore shock is alleviated.

As described above, during the D-N select and at the start of N idle control, shock occurs due to a step in the output shaft torque, but according to the first embodiment, the shock can be alleviated in both cases. Shock occurring at the start of the N idle control is unexpected for the driver, and therefore the effect of alleviating this shock, i.e. reducing the uncomfortable feeling and sense of discomfort felt by the driver, is particularly striking. The reason why the shock occurring at the start of the N idle control is unexpected for the driver is that the shock occurring during the D-N select is generated after the driver performs an operation whereas the shock occurring at the start of the N idle control occurs automatically when the N idle condition is established, regardless of the intentions of the driver.

Figure 7C:
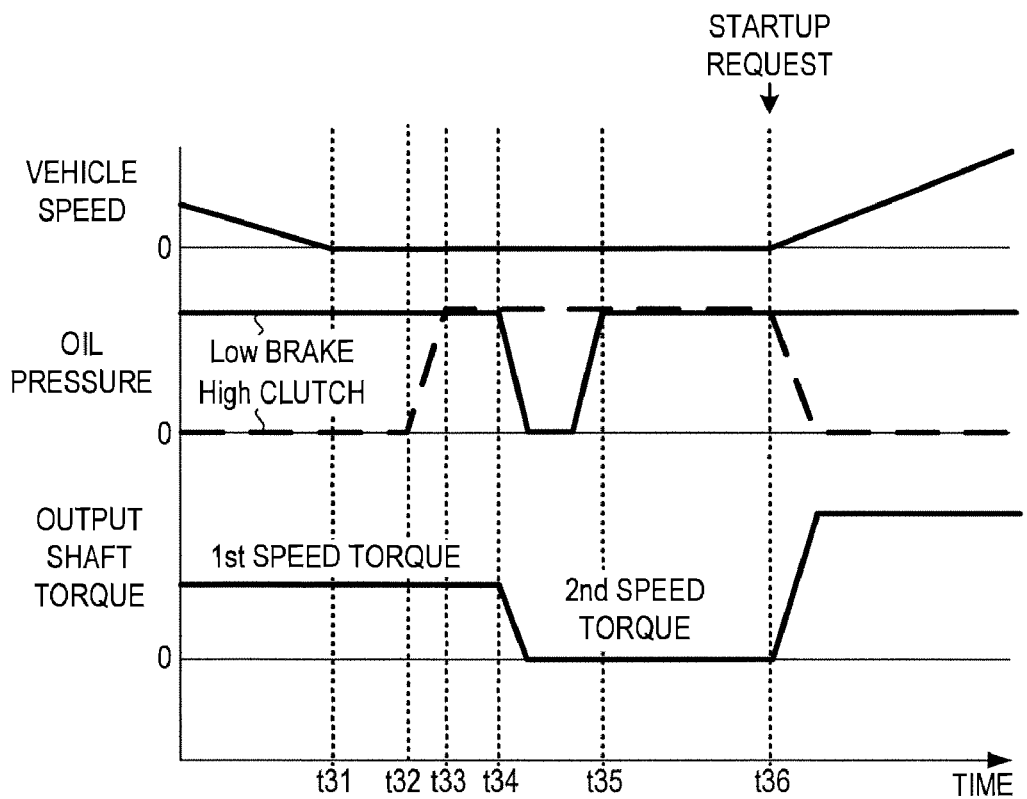
FIG. 7C is a time chart showing a case in which the second speed interlocking condition is established after the vehicle stops, and the vehicle is restarted from this state.

FIG. 7C is a time chart showing a case in which the second speed interlocking condition is established after the vehicle stops, and the vehicle is restarted from this state.

Times t31 to t35 are identical to the times t11 to t15 in FIG. 7A, and therefore the second speed interlocking condition is realized in the subtransmission mechanism 30 during this period.

At a time t36, a startup request is issued, and therefore the second speed interlocking condition is canceled by draining the oil pressure supplied to the High clutch 33 in order to disengage the High clutch. The torque transmitted to the output shaft of the transmission 4 increases immediately from the second speed torque to the first speed torque, and therefore a deficiency in startup driving force does not occur even though the output shaft torque fell to the second speed torque when the vehicle stopped. Furthermore, the Low brake 32 is already engaged, and therefore an engagement delay in the Low brake 32 does not occur.

Hence, according to this control, shock can be alleviated during the D-N select and at the start of the N idle control, and when a startup request is issued, a driving force deficiency can be prevented.

Next, a second embodiment will be described.

In the first embodiment, the mode switch line is set on the shift map (FIG. 3) such that when the vehicle stops, the gear position of the subtransmission mechanism 30 shifts to the first speed.

In the second embodiment, on the other hand, the mode switch line is used only to switch from the low speed mode to the high speed mode, or in other words, only during a 1-2 shift in the subtransmission mechanism 30. Further, the gear position of the sub-transmission mechanism 30 is shifted to the second speed when the vehicle is stationary by setting a separate mode switch line (not shown) for switching from the high speed mode to the low speed mode or by performing a 1-2 shift in the subtransmission mechanism 30 and then maintaining the gear position of the subtransmission mechanism 30 at the second speed until the vehicle stops.

Figure 8:
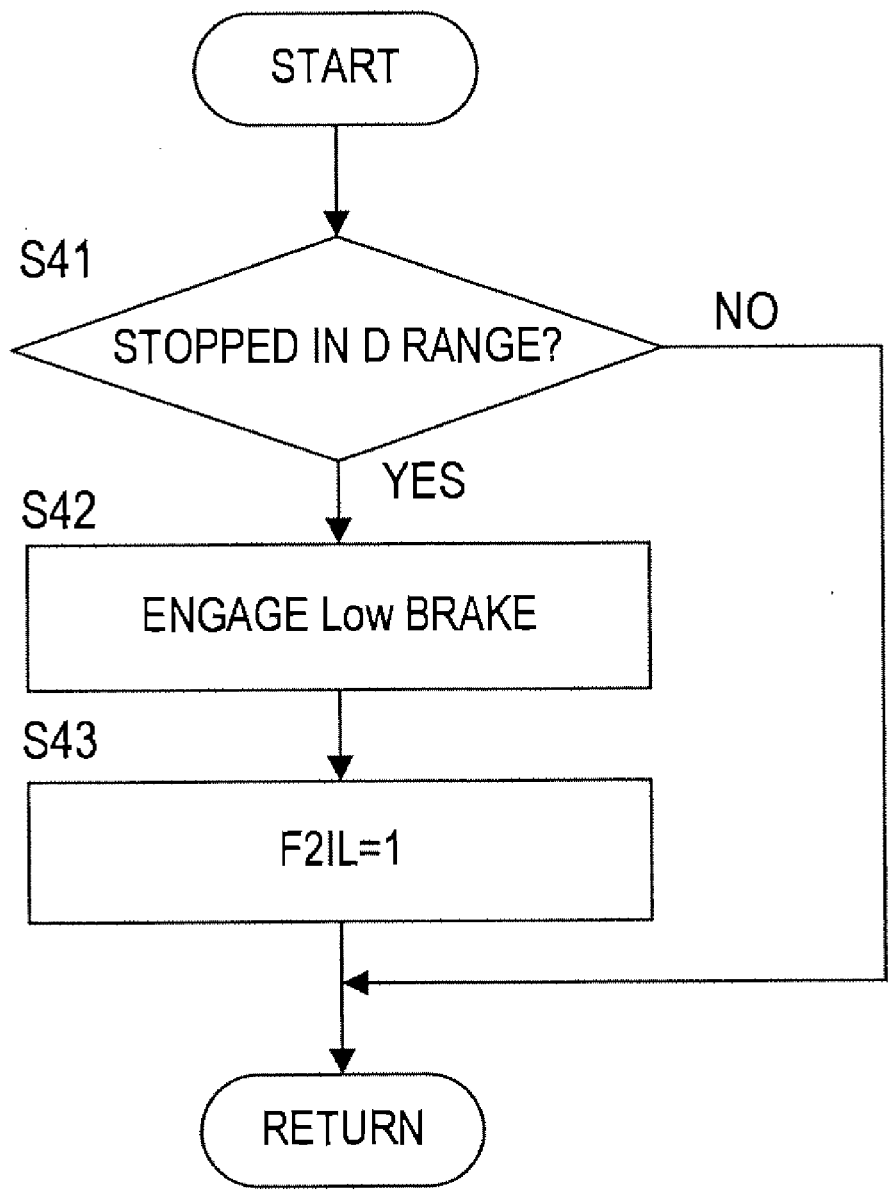
FIG. 8 is a flowchart showing the content of control executed to realize the second speed interlocking condition when the vehicle stops in a state where a gear position of a subtransmission mechanism is a second speed.

In contrast to the first embodiment, the gear position of the subtransmission mechanism 30 during vehicle stoppage is the second speed, and therefore, in the second embodiment, the second speed interlocking condition is realized in the subtransmission mechanism 30 by performing control shown in FIG. 8 instead of the control shown in FIG. 5.

The control shown in FIG. 8 will now be described. In S41, the transmission controller 12 determines whether or not the vehicle has stopped in the D range. When it is determined that the vehicle has stopped in the D range, the processing advances to S42, and when a negative determination is made, the processing is terminated.

In S42, the transmission controller 12 interlocks the subtransmission mechanism 30 by increasing the oil pressure supplied to the Low brake 32 in order to engage the Low brake 32. The subtransmission mechanism 30 continues to transmit torque in the second speed when the Low brake 32 is engaged, and therefore the second speed interlocking condition is realized in the subtransmission mechanism 30.

In S43, the transmission controller 12 sets the flag F2IL at one, indicating that the subtransmission mechanism 30 is in the second speed interlocking condition.

Hence, according to this control, even when the vehicle stops while the gear position of the subtransmission mechanism 30 is at the second speed, the second speed interlocking condition can be realized in the subtransmission mechanism 30 similarly to the first embodiment (S41 to S43).

Control executed in a case where a startup request is issued, the D-N select is performed, or the N idle condition is established when the vehicle is stationary in the second speed interlocking condition is identical to the control of the first embodiment shown in FIG. 6, and therefore identical actions and effects to those of the first embodiment (shock alleviation during the D-N select and at the start of the N idle control and sufficient driving force acquisition for the restart) are obtained.

Next, a third embodiment will be described.

According to the first embodiment, the torque step during the D-N select and at the start of the N idle control can be reduced and shock caused by the torque step can be alleviated by setting the subtransmission mechanism 30 in the second speed interlocking condition when the vehicle stops in the D range.

As described above, however, shock at the start of the N idle control occurs when the N idle condition is established, or in other words regardless of the intentions of the driver, and therefore the uncomfortable feeling and sense of discomfort experienced by the driver are large. Accordingly, there is a greater need to suppress this shock than the shock occurring during the D-N select.

Hence, in the third embodiment, the oil pressure supplied to the Low brake 32 and the High clutch 33 at the start of the N idle control is reduced at a lower speed than a supplied oil pressure reduction speed during the D-N select in order to suppress the shock occurring at the start of the N idle control even further. In other words, the supplied oil pressure is reduced more gently over a longer time period.

The content of control executed by the transmission controller 12 to realize this speed reduction is substantially identical to that of the first embodiment shown in FIG. 6 except for the processing performed in S29 when the N idle condition is established.

More specifically, in S29, the transmission controller 12 starts the N idle control by draining the oil pressure supplied to the High clutch 33 and reducing the oil pressure supplied to the Low brake 32, as in the first embodiment, but in the third embodiment, the supplied oil pressure is reduced more gently than during the D-N select. In other words, the reduction speed of the oil pressure supplied to the Low brake 32 and the High clutch 33 at this time is set to be lower than the reduction speed at which the supplied oil pressure is reduced during the D-N select (S26).

Therefore, in addition to the reduction in the torque step achieved by stopping the vehicle in the second speed interlocking condition, the output shaft torque at the start of the N idle control can be reduced gently, and as a result, shock occurring at the start of the N idle control can be suppressed even further.

Figure 9A:
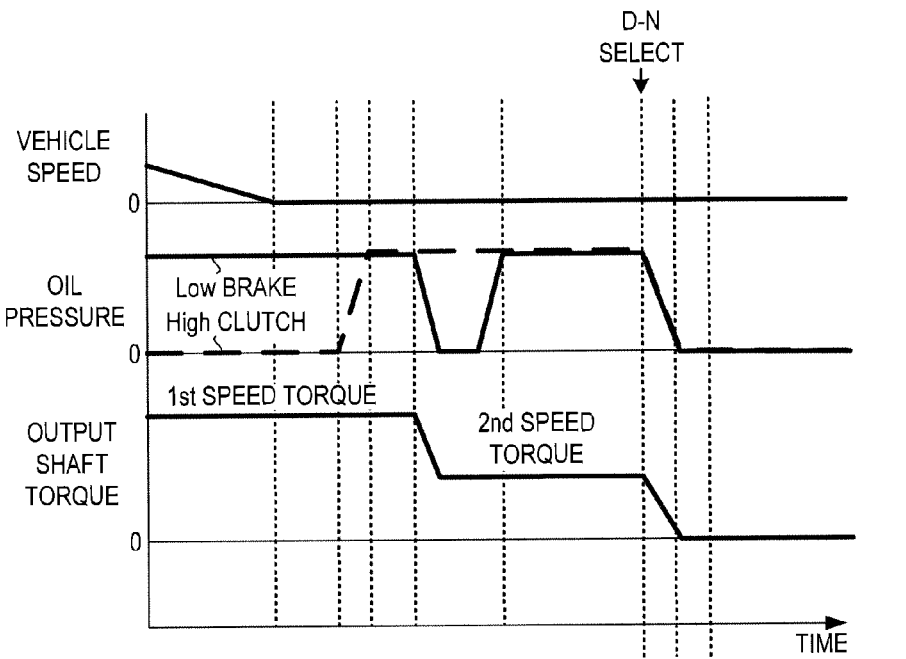
FIGS. 9A and 9B are time charts showing, for comparison, a case in which a D-N select is performed while the vehicle is stationary and a case in which neutral idle control is started while the vehicle is stationary.
Figure 9B:
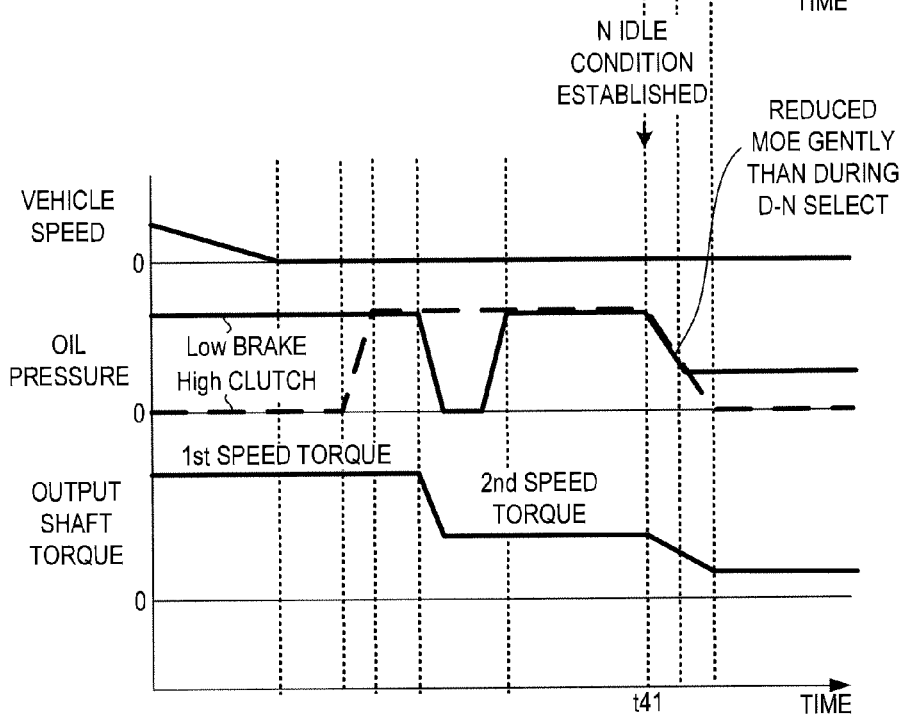

FIGS. 9A and 9B are time charts showing, for comparison, a case in which the D-N select is performed while the vehicle is stationary and a case in which the N idle control is performed while the vehicle is stationary. The parts prior to the time t41, during which the second speed interlocking condition is realized, are identical to the first embodiment.

In FIG. 9A, the D-N select is performed at the time t41, and in FIG. 9B, the N idle condition is established such that the N idle control is started at the time t41. In both cases, the output shaft torque has been reduced to the second speed torque in advance, and therefore the step in the output shaft torque is smaller than that of a case in which the output shaft torque is reduced from the first speed torque. As a result, shock is alleviated.

In addition, in the third embodiment, the oil pressure supplied to the Low brake 32 and the High clutch 33 at the start of the N idle control is reduced more gently than during the D-N select, and therefore the unexpected shock occurring at the start of the N idle control can be suppressed further. Thus, the driver is less likely to feel the shock, and therefore the uncomfortable feeling experienced by the driver can be suppressed even further (S29).

Embodiments of this invention were described above, but the above embodiments are merely examples of applications of this invention, and the technical scope of this invention is not limited to the specific constitutions of the above embodiments.

For example, in the above embodiments, a belt type continuously variable transmission mechanism is used as the variator 20, but the variator 20 may be continuously variable transmission mechanism in which a chain is wrapped around the pulleys 21, 22 instead of the V belt 23. Alternatively, the variator 20 may be a toroidal type continuously variable transmission mechanism in which tiltable power rollers are disposed between an input disk and an output disk.

Further, in the above embodiments, the subtransmission mechanism 30 is a transmission mechanism having two positions, namely the first speed and the second speed, as forward gear positions, but the subtransmission mechanism 30 may be a transmission mechanism having three or more gear positions as forward gear positions.

Moreover, the subtransmission mechanism is constituted by a Ravigneaux type planetary gear mechanism but is not limited to this constitution. For example, the subtransmission mechanism 30 may be constituted by a combination of a normal planetary gear mechanism and a frictional engagement element or by a plurality of power transmission paths formed from a plurality of gear trains having different gear ratios and frictional engagement elements for switching the power transmission paths.

Further, the hydraulic cylinders 23a, 23b are provided as actuators that displace the movable conical plates of the pulleys 21, 22 in the axial direction, but the actuators are not limited to hydraulic driving and may be driven electrically.

Moreover, in a case where the gear position of the subtransmission mechanism 30 is capable of taking either the first speed or the second speed when the vehicle stops, the transmission 4 may determine the gear position of the subtransmission mechanism 30 during the stoppage and execute the control shown in FIG. 5 or the control shown in FIG. 8 in accordance with the gear position during the stoppage.

This application claims priority based on Japanese Patent Application No. 2009-169148 filed with the Japan Patent Office on Jul. 17, 2009 and Japanese Patent Application No. 2010-96773 filed with the Japan Patent Office on Apr. 20, 2010, the entire contents of which are incorporated into this specification.

What is claimed is:

1. A continuously variable transmission installed in a vehicle, comprising:
a variator capable of varying a speed ratio continuously;
a subtransmission mechanism provided in series with the variator and having a first gear position and a second gear position, the second gear position having a smaller speed ratio than the first gear position, as forward gear positions;
a shift control unit that sets a target value of an overall speed ratio of the variator and the subtransmission mechanism on the basis of an operating condition of the vehicle and controls at least one of the variator and the subtransmission mechanism such that the target value is realized;
a second speed interlocking unit that sets the subtransmission mechanism in a second speed interlocking condition, in which a torque is transmitted in the second gear position and both a frictional engagement element of the first gear position and a frictional engagement element of the second gear position are engaged, when the vehicle stops while a position of a select lever remains in a travel range; and
a transmitted torque reduction unit that reduces an output shaft torque of the continuously variable transmission when a predetermined condition is established while the vehicle is stationary.

2. The continuously variable transmission as defined in claim 1, wherein, when the gear position of the subtransmission mechanism at a point where the vehicle stops is the first gear position, the second speed interlocking unit sets the subtransmission mechanism in the second speed interlocking condition by engaging the frictional engagement element of the second gear position to interlock the subtransmission mechanism, disengages the frictional engagement element of the first gear position in this state, and then re-engages the frictional engagement element of the first gear position.

3. The continuously variable transmission as defined in claim 1, wherein, when the gear position of the subtransmission mechanism at a point where the vehicle stops is the second gear position, the second speed interlocking unit sets the subtransmission mechanism in the second speed interlocking condition by engaging the frictional engagement element of the first gear position to interlock the subtransmission mechanism.

4. The continuously variable transmission as defined in claim 1, further comprising:
a startup request detection unit that detects a startup request issued by a driver; and
a startup control unit that disengages the frictional engagement element of the second gear position when the startup request is detected by the startup request detection unit while the subtransmission mechanism is in the second speed interlocking condition.

5. The continuously variable transmission as defined in claim 1, wherein the transmitted torque reduction unit disengages both the frictional engagement element of the first gear position and the frictional engagement element of the second gear position when the select lever of the continuously variable transmission is operated to a non-travel range.

6. The continuously variable transmission as defined in claim 1, wherein the transmitted torque reduction unit performs neutral idle control by disengaging the frictional engagement element of the second gear position and reducing an oil pressure supplied to the frictional engagement element of the first gear position at least until the output shaft torque of the continuously variable transmission decreases.

7. The continuously variable transmission as defined in claim 1, wherein the transmitted torque reduction unit comprises:

a first transmitted torque reduction unit that disengages both the frictional engagement element of the first gear position and the frictional engagement element of the second gear position when the select lever of the continuously variable transmission is operated to a non-travel range; and a second transmitted torque reduction unit that performs neutral idle control by disengaging the frictional engagement element of the second gear position and reducing an oil pressure supplied to the frictional engagement element of the first gear position at least until the output shaft torque of the continuously variable transmission decreases, and a reduction speed of the oil pressure supplied to the frictional engagement element of the first gear position and the frictional engagement element of the second gear position when the output shaft torque is reduced by the second transmitted torque reduction unit is set to be lower than a reduction speed of the oil pressure supplied to the frictional engagement element of the first gear position and the frictional engagement element of the second gear position when the output shaft torque is reduced by the first transmitted torque reduction unit.

8. A control method for a continuously variable transmission that is installed in a vehicle and includes a variator capable of varying a speed ratio continuously and a subtransmission mechanism provided in series with the variator and having a first gear position and a second gear position, the second gear position having a smaller speed ratio than the first gear position, as forward gear positions, the control method comprising:

setting a target value of an overall speed ratio of the variator and the subtransmission mechanism on the basis of an operating condition of the vehicle and controlling at least one of the variator and the subtransmission mechanism such that the target value is realized;

setting the subtransmission mechanism in a second speed interlocking condition, in which a torque is transmitted in the second gear position and both a frictional engagement element of the first gear position and a frictional engagement element of the second gear position are engaged, when the vehicle stops while a position of a select lever remains in a travel range; and reducing an output shaft torque of the continuously variable transmission when a predetermined condition is established while the vehicle is stationary.

9. A continuously variable transmission installed in a vehicle, comprising:

a variator capable of varying a speed ratio continuously;

a subtransmission mechanism provided in series with the variator and having a first gear position and a second gear position, the second gear position having a smaller speed ratio than the first gear position, as forward gear positions;

means for setting a target value of an overall speed ratio of the variator and the subtransmission mechanism on the basis of an operating condition of the vehicle and controlling at least one of the variator and the subtransmission mechanism such that the target value is realized;

means for setting the subtransmission mechanism in a second speed interlocking condition, in which a torque is transmitted in the second gear position and both a frictional engagement element of the first gear position and a frictional engagement element of the second gear position are engaged, when the vehicle stops while a position of a select lever remains in a travel range; and means for reducing an output shaft torque of the continuously variable transmission when a predetermined condition is established while the vehicle is stationary.

* * * * *